Feb. 22, 1944.  H. SHACKLETON ET AL  2,342,430
HAND TRUCK FOR TRANSPORTING MACHINERY AND THE LIKE
Filed Aug. 5, 1942  5 Sheets-Sheet 1

Inventors
H. Shackleton & A. D. Pochin
By Glascock Downing Seebold Attys

Feb. 22, 1944.  H. SHACKLETON ET AL  2,342,430
HAND TRUCK FOR TRANSPORTING MACHINERY AND THE LIKE
Filed Aug. 5, 1942  5 Sheets-Sheet 2

Inventors
H. Shackleton and A. D. Pochin
By Glascock Downing & Seebold Attys.

Feb. 22, 1944.   H. SHACKLETON ET AL   2,342,430
HAND TRUCK FOR TRANSPORTING MACHINERY AND THE LIKE
Filed Aug. 5, 1942   5 Sheets-Sheet 3

Inventors
H. Shackleton
A. D. Pochin
By Glascock Downing Seibold
Attys.

Feb. 22, 1944. H. SHACKLETON ET AL 2,342,430
HAND TRUCK FOR TRANSPORTING MACHINERY AND THE LIKE
Filed Aug. 5, 1942 5 Sheets-Sheet 4
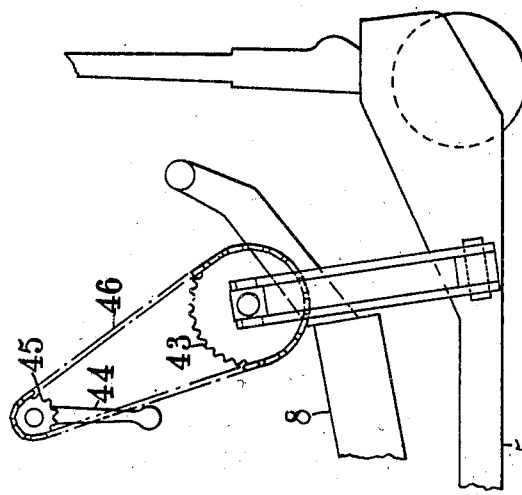
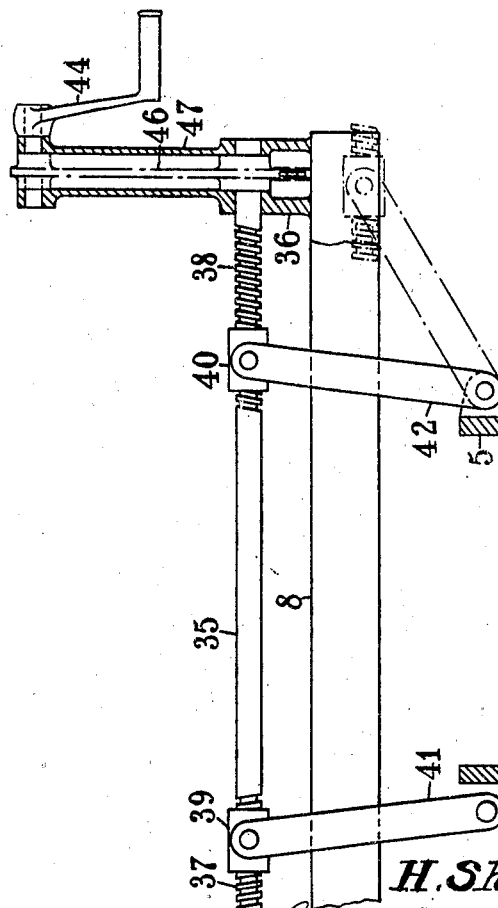
Inventors
H. Shackleton
A. D. Pochin
By Glascock Downing Leebold
Attys.

Feb. 22, 1944. H. SHACKLETON ET AL 2,342,430
HAND TRUCK FOR TRANSPORTING MACHINERY AND THE LIKE
Filed Aug. 5, 1942 5 Sheets-Sheet 5

Inventors
H. Shackleton
A. D. Pochin
By Hancock Downing & Seebold Attys

Patented Feb. 22, 1944

2,342,430

UNITED STATES PATENT OFFICE 2,342,430

HAND TRUCK FOR TRANSPORTING MACHINERY AND THE LIKE

Harry Shackleton, Penn Fields, Wolverhampton, and Alfred Davis Pochin, Hammerwich, near Walsall, England, assignors to The Yale and Towne Manufacturing Company, Stamford, Conn.

Application August 5, 1942, Serial No. 453,748
In Great Britain June 11, 1941

9 Claims. (Cl. 214—65)

This invention relates to hand trucks for use in the transport of machinery plant or the like, of the character described in British Specification No. 487,382 and comprising a platform mounted upon a wheeled under-carriage adapted to support and convey the load and being displaceable relatively to the under-carriage for extending the upper surface of the platform to the ground whereby the machinery or the like may be slid thereon.

An object of the invention is to provide an improved hand truck of the type set forth whereby the platform may be moved to a position in which its upper surface is horizontal.

The invention consists in a hand truck for the purpose described comprising a platform having a load supporting surface, mounted upon a wheeled undercarriage adapted to support and convey the load and being displaceable relatively to the undercarriage from a horizontal or substantially horizontal load-transporting position to an inclined position in which the surface of the platform extends to the floor whereby machinery or the like may be slid onto or from the platform.

By means of the invention the clearance between the end of the platform and the ground is increased whereby loads longer than the platform may be carried. Further by arranging the platform surface horizontal loads may be carried without the necessity of lashing them to the truck. The horizontal positioning of the platform also permits the lowering of loads on to the platform for example from a crane which would be undesirable with an inclined platform.

The platform may be pivotally mounted on the undercarriage and the means controlling the relative displacement between the platform and undercarriage may comprise crank means supported upon the undercarriage and connected to the platform by link means.

The crank means may be mounted upon a shaft adapted to be rotated by cam, ratchet, or worm gearing or by power means.

In the accompanying drawings:

Figure 3 is a perspective view of certain details,

Figures 6 and 7 are partial views showing a modified means for controlling the inclination of the platform.

Figure 1:
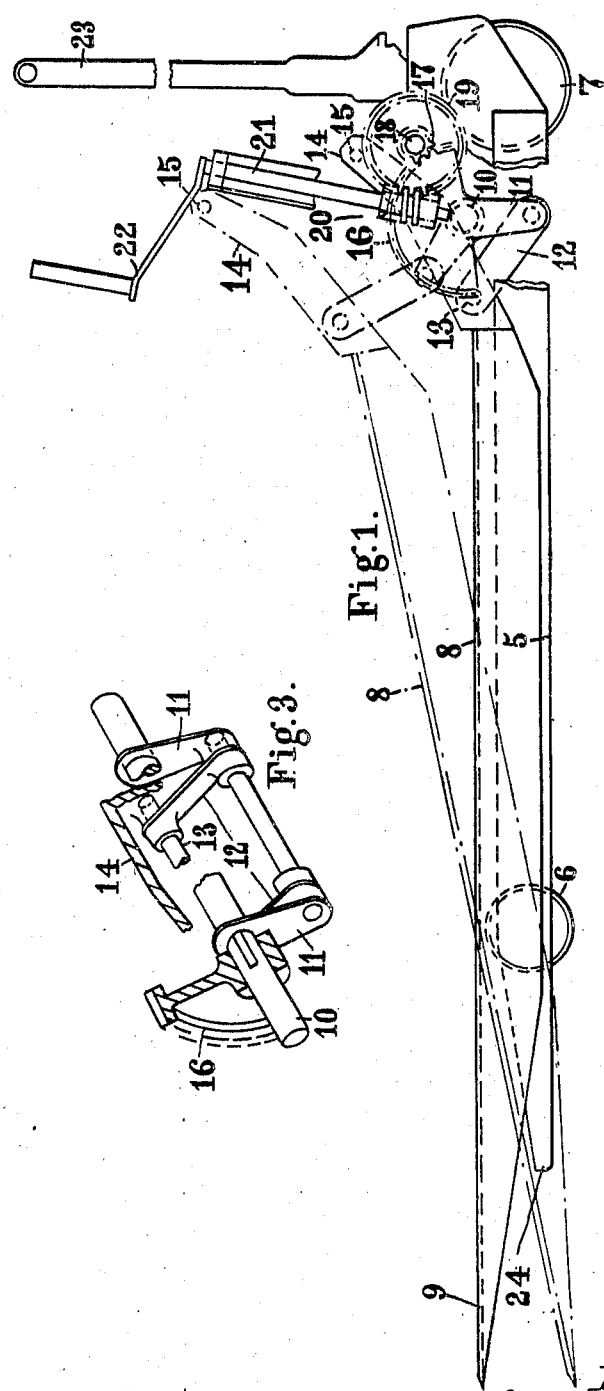
Figure 1 is an elevation of an improved hand truck according to the invention.
Figure 2:
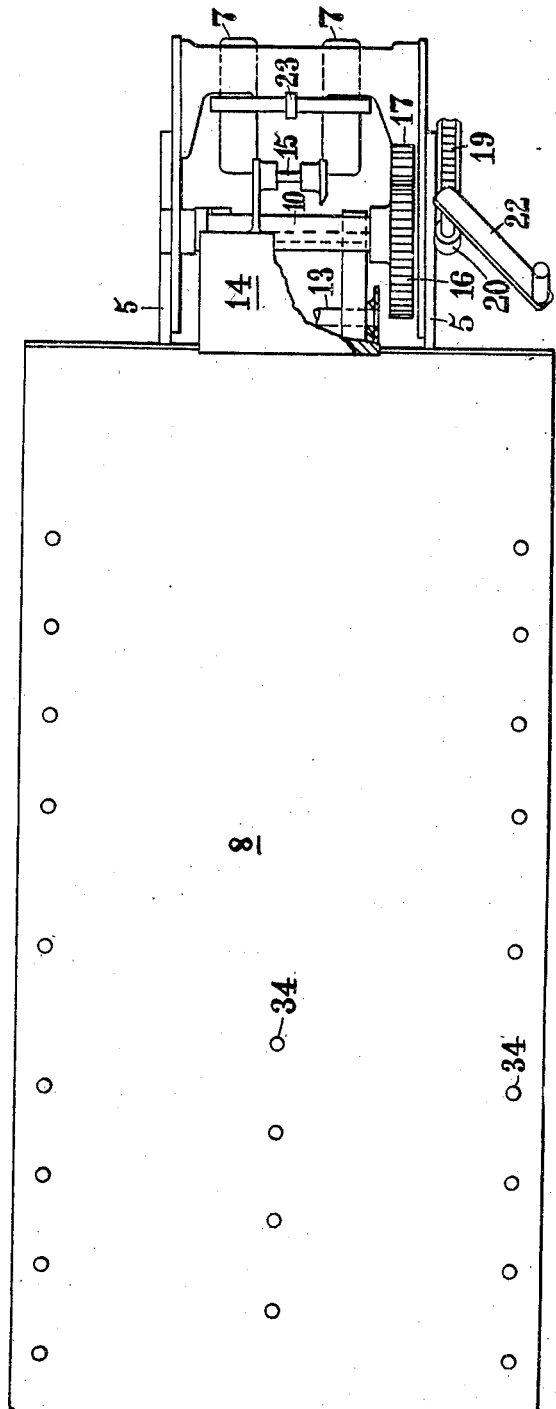
Figure 2 is a plan corresponding to Figure 1.

In carrying the invention into effect according to one convenient mode by way of example a wheeled undercarriage 5 is provided supported at the rear end upon a pair of wheels 6 and at the forward end upon swivel caster wheels 7 or other suitable wheels adapted to facilitate guiding movements.

A platform 8 is pivotally mounted upon the undercarriage 5, the pivotal axis conveniently coinciding with the axes of the rear wheels 6 of the undercarriage. The platform 8 is arranged to overhang the undercarriage at the rear end thereof and at its outer end 9 is tapered so that the upper surface adjacent the end may be brought to ground level when the platform is suitably inclined.

At its forward end the platform 8 is connected to the undercarriage 5 by linkage adapted to permit an inclination of the platform as above referred to and also a pivotal movement to bring its upper load supporting surface in a horizontal or substantially horizontal position.

The connecting means preferably comprise a shaft 10 rotatably mounted in bearings on the undercarriage and having crank arms or levers 11 secured thereto at the ends. The outer ends of these crank arms 11 are pivoted to links 12, the other ends of which are pivotally connected at 13 to the platform 8. The connection to the platform is conveniently provided by arms or a channel element 14 extending in an upwardly inclined direction from the platform and terminating in a crossbar 15 to which suitable hoisting tackle may be anchored.

The shaft 10 is adapted to be manually rotated by any suitable mechanical aids whereby the pivotal movements of the platform 8 are effected.

According to one arrangement the shaft 10 has secured thereon a segmental gear 16 which meshes with a pinion 17 mounted on a shaft 18. The shaft 18 also carries a worm wheel 19 with which a worm 20 meshes. The worm 20 is mounted upon a shaft 21 having an operating handle 22. The gear 19, 20 is so designed by the selection of the lead angle of the worm or by the provision of a suitable brake that there is no tendency for the gear to reverse and thus overbalancing cannot occur.

The truck is provided with a manipulating handle 23.

The rear end of the truck 5 is extended at 24 to prevent an unbalanced or variable load capsising the platform to an extent to cause the end of the platform to contact the ground, thereby preventing crushing of the foot of the operator.

Figure 4:
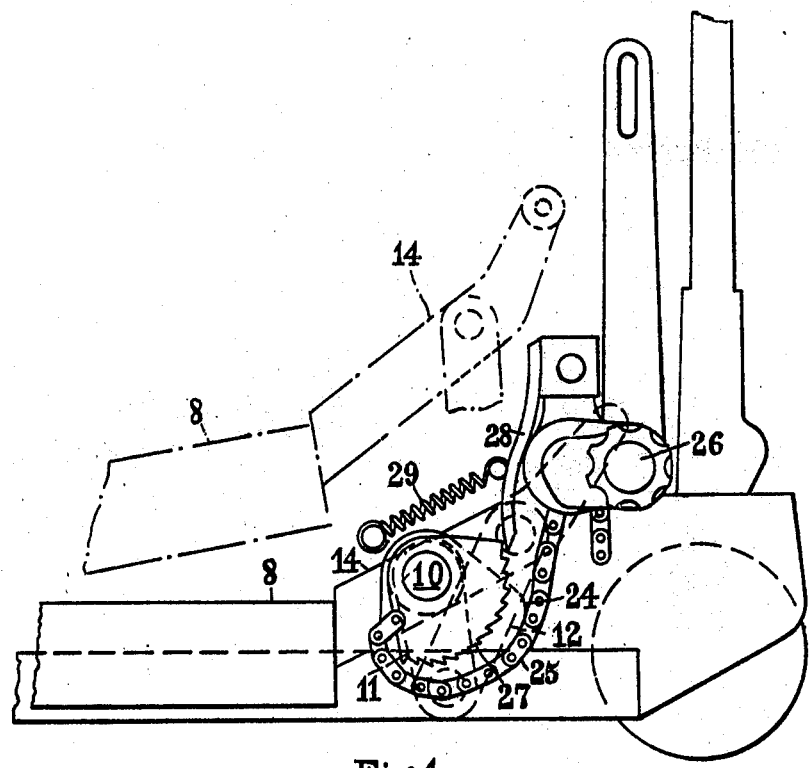
Figure 4 is an elevation of a modified form of manipulating gear.

According to an alternative arrangement, see Figure 4, a cam wheel 24 is fixed to the shaft 10 and has wound thereon a chain, wire, rope or other flexible element 25 the other end of which is secured to a hoisting mechanism 26 mounted upon the undercarriage. This mechanism may conveniently be of the nature disclosed in British Patent Specification No. 469,967 and known as a Pul-Lift. The cam 24 is preferably designed to give quick raising where the load is light and a slower movement with greater mechanical advantage at the middle of the stroke where the torque is at its maximum. With such an arrangement the platform 8 is lowered when the centre of gravity of the load is between the pivotal axis of the platform and the highest end and thus the load in effect lowers itself under the control of the operator via the Pul-Lift.

There is the possibility that the centre of gravity of the load may be so close to the pivotal axis of the platform that any additional load such as a person stepping on the rear end of the platform may overbalance the load and platform. This may be prevented by the provision of a ratchet (or segment) wheel 27, secured to the cam, such ratchet being adapted for engagement by a swinging pawl 28. The pawl is controlled by the tightness of the chain or the like 25 attached to the cam, and also by a spring 29 secured to the undercarriage. Should the chain 25 slacken due to an over-balancing movement as referred to above, the spring 29 draws the pawl 28 on to the ratchet 27 and arrests the movement. When the chain is tightened either by the load or by the action of raising the forward end of the platform from the horizontal the pawl 28 is pulled away from the ratchet 27 and permits the raising operation to be carried out.

Figure 5:
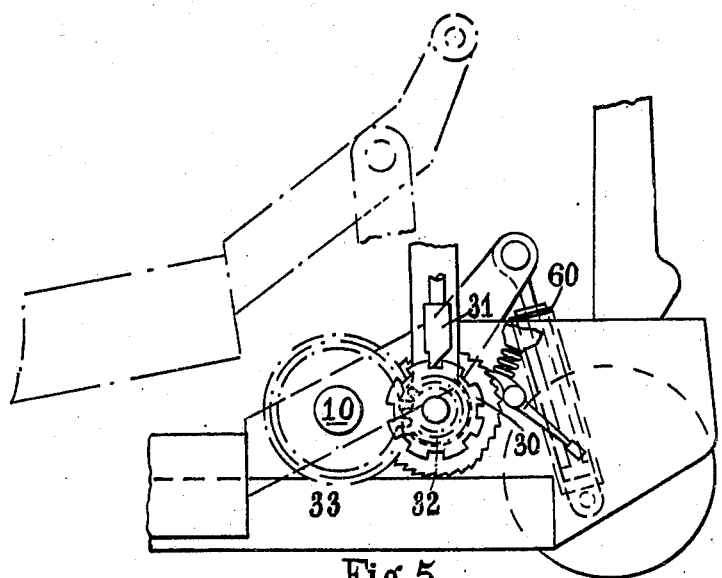
Figure 5 is an elevation of a further modification.

According to a further modified arrangement, see Figure 5, for operating the crank shaft 10, ratchet means 30 having a two-way pawl 31 is connected to the shaft 10 either directly or as shown through reduction gearing 32, 33. The ratchet wheel 30 is connected to a Weston type self-applying screw type brake in a manner similar to those used in chain blocks and other hoisting apparatus.

With this form the loaded platform 8 is moved to the horizontal against the brake and raised to the inclined position direct. It may be necessary or desirable with this form to provide a safety ratchet means operated by a spring as in the first form, such ratchet being thrown out of hand or automatically when raising the platform.

It will be appreciated that the upper surface of the platform 8 is smooth to permit loads being slid thereon or it may be provided with series of side rollers. Further it may be provided with a longitudinal series of holes 34 for a crow bar where rollers are not provided.

It will be obvious that the platform may be tilted by suitable power means, electrical or mechanical. Also the propelling of the truck may be effected by power means.

In operation when it is desired to transfer a load from the ground onto the truck, the platform is tilted by operation of the shaft 10 until the end 9 engages the floor. The load is then slid up the platform if necessary by tackle secured to the bar 15. The platform is then pivoted to return it to the horizontal position so that the end 9 is raised to a height sufficient to clear obstructions on the floor.

When in the horizontal position the forward end of the platform may abut against a stop or a part of the undercarriage.

It will be appreciated that the platform may be moved to a position slightly beyond the horizontal instead of being truly horizontal.

According to a modified arrangement, see Figures 6 and 7, the control of the pivotal movement of the platform may be effected by a transverse racking screw 35. This screw is mounted in bearings 36 on the platform 8 and is provided with right and left hand threaded portions 37, 38 having associated nuts 39, 40. The nuts are pivotally mounted in links 41, 42, the lower ends of which are pivoted to the undercarriage 5. At one (or both) ends the screw 35 has secured thereto a sprocket wheel 43 adapted for rotation by the handle or crank 44 through the sprocket and chain 45, 46. The handle and sprocket 45 are carried by a bracket 47 secured to the platform.

Figure 8:
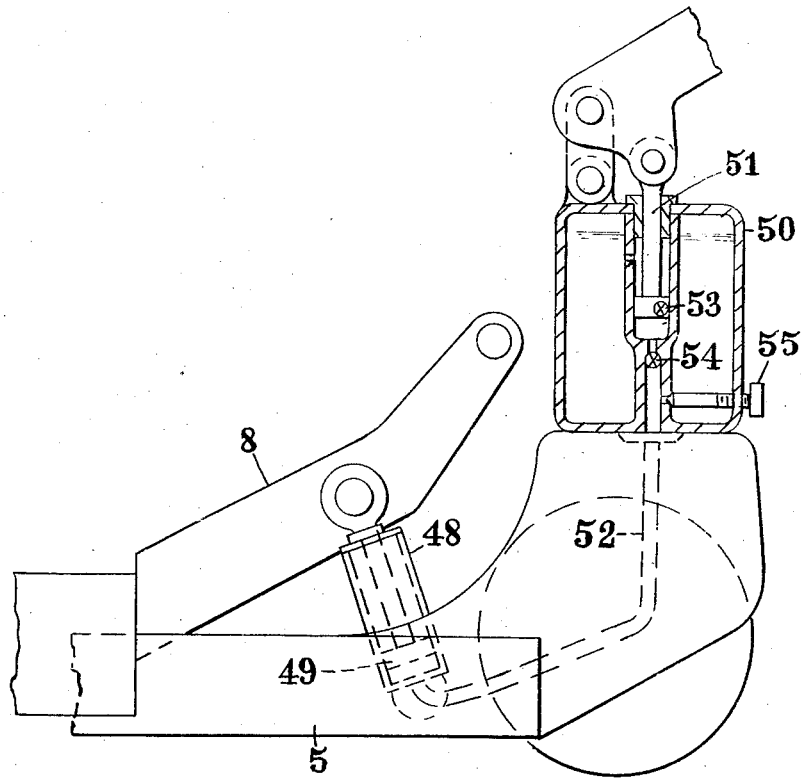
Figure 8 is a partial view illustrating hydraulic control means for the platform.

According to another form, see Figure 8, the platform may be controlled by hydraulic means comprising a hydraulic cylinder 48 pivotally secured to the undercarriage 5 and a piston 49 pivotally secured to the platform 8. Pressure fluid is supplied from a reservoir 50 by means of a pump 51 through the conduit 52. The flow of liquid is controlled by non-return valves 53, 54. Lowering of the platform is effected by by-passing the liquid from the power cylinder into the reservoir by the releaser valve 55.

Figure 9:
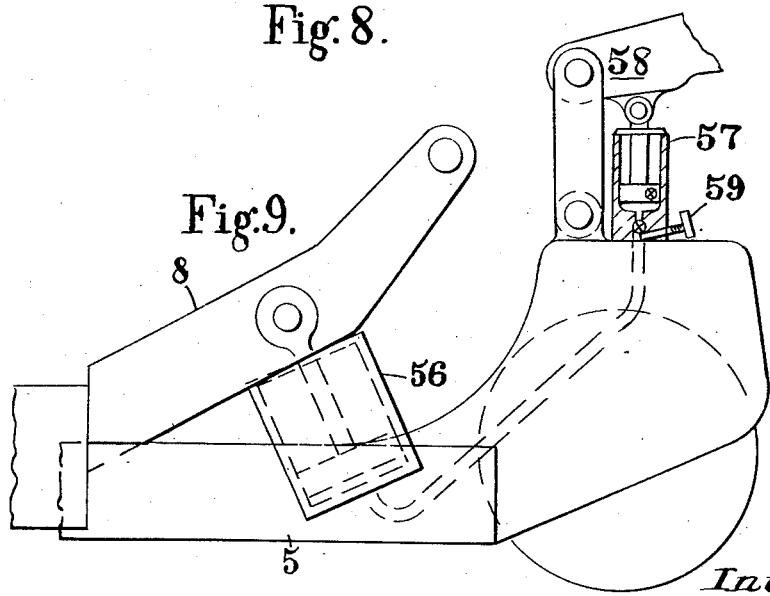
Figure 9 is a partial view illustrating compressed air control means for the platform.

Instead of a liquid compressed air may be the motive fluid. Thus, referring to Figure 9, a cylinder 56 is supplied with compressed air by the pump 57, operated by the lever 58. Lowering of the platform is effected by opening the release valve 59 which allows the compressed air to escape to atmosphere.

According to a further arrangement applied for example to the form of the invention shown in Figure 5 the lowering of the platform may be under the control of a dashpot 60 connected between the platform and undercarriage.

It is to be noted that constructional features described in British Specification No. 487,382, other than those above described, may be applied to the improved truck according to the present invention.

We claim:

1. A hand truck for transporting machinery, plant or the like, comprising a wheeled undercarriage, a platform pivotally supported by the undercarriage, said platform having an unobstructed load carrying surface, a shaft carried upon the undercarriage, crank means secured to said shaft, link means coupling the crank means to said platform, and means comprising worm gearing for rotating said shaft to pivot the load carrying surface from a horizontal load transporting position to an inclined position in which said surface extends to the floor, whereby machinery or the like may be slid onto said surface.

2. A hand truck for transporting machinery, plant or the like, comprising a wheeled undercarriage, a platform pivotally supported upon the undercarriage, said platform having an unobstructed load carrying surface, a shaft carried by the undercarriage, crank means secured to said shaft, link means coupling the crank means to said platform, a toothed sector on said shaft, a pinion meshing with the toothed sector, and a worm gear driving said pinion to cause rotating of said shaft to pivot the load carrying surface from a horizontal load transporting position to an inclined position in which said surface extends to the floor, whereby machinery or the like may be slid onto said surface.

3. A hand truck for transporting machinery, plant or the like, comprising a wheeled undercarriage, a platform pivotally supported by the undercarriage, said platform having a load carrying surface, a shaft carried upon the undercarriage and arranged transversely thereto, a crank arm secured to and rotatable with said shaft, a link pivotally connected to the outer end of the crank arm and to the platform, and means for rotating the shaft to impart a thrust to the platform through said link to pivot the surface of the platform from a horizontal load transporting position to an inclined position in which said surface extends to the floor, whereby machinery or the like may be slid onto said surface.

4. A hand truck for transporting machinery, plant or the like, comprising a wheeled undercarriage, a platform pivotally supported upon the undercarriage, said platform having an unobstructed load carrying surface, a shaft carried by the undercarriage, crank means secured to the shaft, link means coupling the crank means to said platform, a cam carried by the shaft, hoisting means located on the undercarriage, and a chain operatively connected to said cam and said hoisting means, whereby actuation of the hoisting means causes rotation of the shaft to pivot the load carrying surface from a horizontal load transporting position to an inclined position in which said surface extends to the floor, whereby machinery or the like may be slid onto said surface.

5. A hand truck for transporting machinery, plant or the like, comprising a wheeled undercarriage, a platform pivotally supported upon the undercarriage, said platform having an unobstructed load carrying surface, a shaft carried by the undercarriage, crank means secured to the shaft, link means coupling the crank means to said platform, hoisting means comprising a pul-lift device located on the undercarriage, a cam carried by the shaft, the chain of said pul-lift device operatively connected to said cam, whereby actuation of said pul-lift device causes rotation of said shaft to pivot the load carrying surface from a load transporting position to an inclined position in which said surface extends to the floor, whereby machinery or the like may be slid onto said surface.

6. A hand truck for transporting machinery, plant or the like, comprising a wheeled undercarriage, a platform pivotally supported upon the undercarriage, said platform having an unobstructed load carrying surface, a shaft carried by the undercarriage, crank means secured to the shaft, link means coupling the crank means to said platform, a cam carried by the shaft, a pul-lift hoisting device located on the undercarriage, the chain of said pul-lift device operatively connected to said cam, whereby actuation of said pul-lift device causes rotation of said shaft to pivot the load carrying surface from a load transporting position to an inclined position in which said surface extends to the floor, a ratchet wheel secured to the cam, and a pawl pivotally hung on the undercarriage to cooperate with the ratchet wheel to prevent over balancing of the loaded platform consequent upon slackening of said chain.

7. A hand truck for transporting machinery, plant or the like, comprising a wheeled undercarriage, a platform pivotally supported upon the undercarriage, said platform having an unobstructed load carrying surface, a shaft carried by the undercarriage, crank means secured to the shaft, link means coupling the crank means to said platform, ratchet means for rotating said shaft to pivot the load carrying surface from a horizontal load transporting position to an inclined position in which said surface extends to the floor, said ratchet means incorporating a self applying brake.

8. A hand truck for transporting machinery, plant or the like, comprising a wheeled undercarriage, a platform pivotally supported upon the undercarriage, said platform having an unobstructed load carrying surface, a shaft carried by the undercarriage, crank means secured to the shaft, link means coupling the crank means to the platform, ratchet means mounted on the undercarriage, reduction gearing between said ratchet means and the shaft, said ratchet means incorporating a self applying brake, the actuation of said ratchet means rotating said shaft and causing the pivoting of the load carrying surface from a horizontal load transporting position to an inclined position in which said surface extends to the floor.

9. A hand truck as claimed in claim 3, wherein the platform extends beyond the rear of the undercarriage and the undercarriage is provided with a rear formation preventing the platform engaging the floor in the event of the load capsising the platform when the platform occupies the load carrying position.

HARRY SHACKLETON.
ALFRED DAVIS POCHIN.